(No Model.)

J. KRUESI.
JUNCTION BOX FOR ELECTRIC CONDUCTORS.

No. 366,173. Patented July 5, 1887.

WITNESSES:
E. C. Rowland
V. H. Seely

INVENTOR:
John Kruesi
By Richd. N. Dyer,
Atty.

UNITED STATES PATENT OFFICE.

JOHN KRUESI, OF BROOKLYN, ASSIGNOR TO THE EDISON MACHINE WORKS, OF SCHENECTADY, NEW YORK.

JUNCTION-BOX FOR ELECTRIC CONDUCTORS.

SPECIFICATION forming part of Letters Patent No. 366,173, dated July 5, 1887.

Application filed August 5, 1882. Serial No. 68,573. (No model.)

*To all whom it may concern:*

Be it known that I, JOHN KRUESI, of Brooklyn, in the county of Kings and State of New York, have invented a certain new and useful Improvement in Junction-Boxes for Electrical Conductors, of which the following is a specification.

My invention relates to the boxes used for joining the ends of the underground conductors used in multiple arc electric-lighting systems, which conductors consist of copper bars or rods laid in pairs inside of metal tubes and surrounded and separated from the tubes and from each other by insulating material. The tubes, at points where the conductors are to be connected, are run into boxes within which the proper connections are made.

The present invention consists in certain improvements on such boxes, such improvements being applicable to all the various forms of boxes—service-boxes, elbow-boxes, &c.—which are used in such systems.

Figure 1:
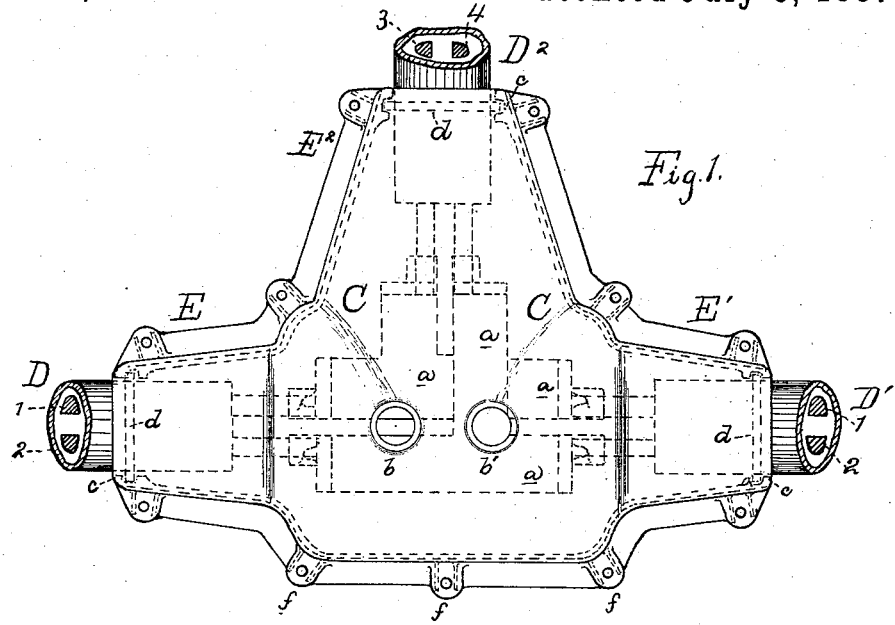
Figure 2:
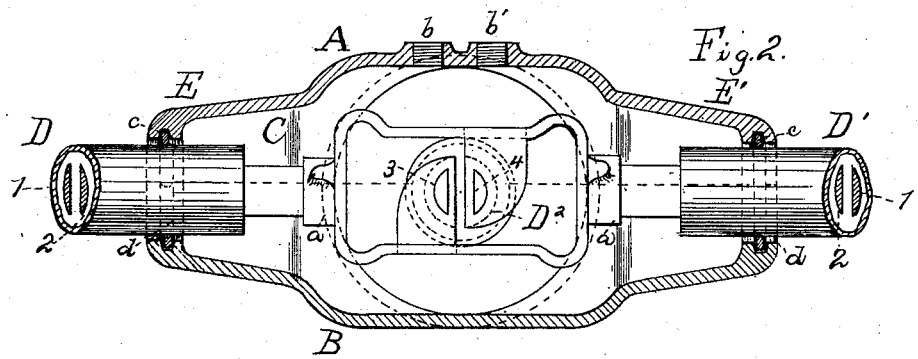
Figure 3:
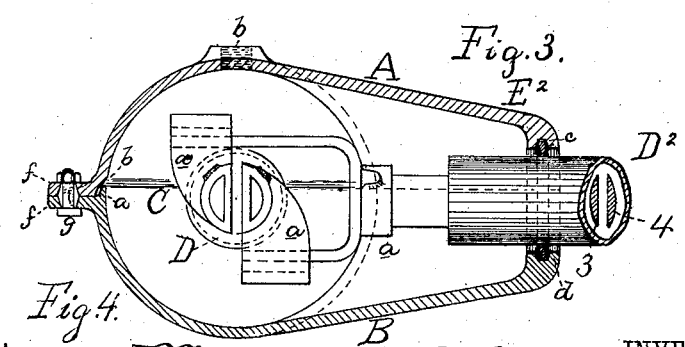

In the accompanying drawings, Figure 1 is a top view of a T-box, the interior parts being shown in dotted lines; Fig. 2, a vertical longitudinal section of the same, the ends of the inclosing-tubes being in elevation; Fig. 3, a transverse vertical section of the same; and Fig. 4, a view of a portion of another form of box.

The T-box is shown as an illustration, the invention being, as stated, applicable to all the different boxes used. Each box is made in two equal halves, A B, the box being divided horizontally in its center. The lower part, B, has a flange projecting upwardly within A and overlapping the edge of the part A, as seen at $a$, Fig. 3, a small space, $b$, being left, into which the insulating material, with which the box is entirely filled, will penetrate, so as to seal the joint, such insulating material being poured in while soft or in a semi-liquid condition and allowed to cool and harden. Flanges are also formed around the edges of the two halves, and lugs $ff$ are provided, through which pass the bolts $g$, which hold the box together. The insulating substance which fills the box is poured in through a hole, $b$, in the cover of the box, while a hole, $b'$, serves as an exit for the displaced air. The box is filled with the substance, which is allowed to cool, and as it shrinks during such cooling a further quantity is poured into the box, this process being continued until the box can hold no more. The holes $b\ b'$ are screw-threaded and are provided with screw-plugs which are inserted after filling and can be readily withdrawn when necessary.

D D' are tubes containing a pair of conductors, 1 2. The tube $D^2$ holds conductors 3 4, which form a multiple-arc circuit from 1 2. Within the box the conductors project from the inclosing-tubes and are attached to copper connecting-pieces $a\ a$, by which connection between them is made. The ends or sides E E' $E^2$ of the box, through which the conductors enter, are provided with openings for this purpose. These tube-openings are preferably made cone-shaped, as shown, so that when the insulating material C is placed in the box and flows into these portions it will become wedged and packed in, so as to hold the ends of the tubes firmly, the movement of the tubes in contracting and expanding serving to pack the plastic insulating material more tightly around them, preventing the admission of moisture to the box.

Figure 4:
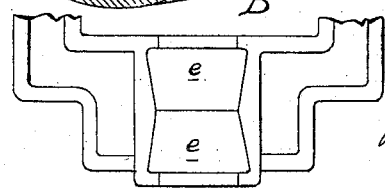

In the construction shown in Fig. 4 a double cone, $e\ e$, is used instead of the single one, and the insulating substance is wedged therein, as before. In the side of each of the apertures through which the tubes pass is formed a groove, $c$, in which fits a metal washer, $d$. The edges of such washers project beyond the grooves, so that only a single bearing is formed for the tube, which forms a fulcrum therefor, so that it need not necessarily enter the box in a straight line, but, if desired, at a slight deviation therefrom, it not being in contact with the sides of the apertures. The metal washer also enables the same size of boxes to be used with pipes of different sizes, the hole in the washer being varied to suit the pipe, while its outside diameter remains the same. It is often desirable after running a line of tubes a certain distance to continue with a smaller size, which can be done without change in the size of the boxes.

It is evident that all the above described improvements could be used as well with coupling-boxes, service-boxes, elbow-boxes, junction-boxes, &c., as with the T-box shown.

What I claim is—

1. The combination, with tubes containing electrical conductors, of boxes for joining the ends of such tubes, such boxes having cone-shaped or beveled tube openings and connections within the boxes between the conductors, substantially as set forth.

2. The combination, with the boxes having cone-shaped tube-openings, of the tubes entering such openings, and a single fulcrum bearing for the tube within each opening, substantially as set forth.

3. The combination, with the boxes having grooved cone-shaped tube-openings and the tubes entering such openings, of the metal washers held by such grooves and forming fulcrum-bearings for the tubes, substantially as set forth.

JOHN KRUESI.

Witnesses:
WM. H. MEADOWCROFT,
H. W. SEELY.